United States Patent Office 2,891,055
Patented June 16, 1959

2,891,055

PROCESSING CELLULOSE NITRATE

Arthur W. Sloan, Washington, D.C., and David J. Mann, Wharton, N.J., assignors to Atlantic Research Corporation, Alexandria, Va., a corporation of Virginia No Drawing. Application August 13, 1954
Serial No. 449,777

17 Claims. (Cl. 260—223)

This invention relates to a new and improved process for preparing cellulose nitrate in the form of small, spherical particles of high density.

Processes for preparing ball powder from high nitrogen content cellulose nitrate (12.4–13.4% nitrogen) are described in Olsen et al., U.S. 2,027,114, and Shaefer, U.S. 2,160,626. In the former patent, a colloid, such as starch, is used to obtain sphere formation and the products are highly porous, with specific gravities ranging from about 0.25 to 0.5. In the latter patent, a solute such as sodium sulfate, is added to the aqueous phase of the emulsion to increase density of the cellulose nitrate spheres. It is stated that specific gravities as high as 0.8 to 1.0 may be obtained. However, in view of actual specific gravity of high nitrogen content cellulose nitrate of 1.58 to 1.66 depending upon degree of nitration, it is evident that a product having a specific gravity of 0.8 to 1.0 possesses a high degree of porosity. For some uses, considerably denser spherical particles are required. An additional disadvantage of these processes stems from the fact that the smallest particle produced is about 6 mils of 150 microns and these are obtainable only as a screened fraction of a batch containing a large proportion of considerably larger spheres. Thus these processes cannot meet a requirement for cellulose nitrate spheres smaller than 6 mils and even the smaller sizes produced by these methods constitute only a portion of a given production.

The object of this invention is to provide a process for making small, substantially non-porous, spherical particles of cellulose nitrate of high nitrogen content, namely cellulose nitrate containing more than 12% nitrogen.

Other objects and advantages will become obvious from the following detailed description.

We have discovered that high nitrogen content cellulose nitrate particles having the desired characteristics of size, sphericity and substantial non-porosity may be obtained when the cellulose nitrate in specified concentration is dissolved in an organic solvent characterized by certain essential properties and the resulting lacquer is dispersed with vigorous agitation in specified amounts of water in the presence of certain colloids together with water-soluble salts or water-soluble polyhydroxy compounds to form an oil-in-water type emulsion. In some cases it is also desirable to introduce a polar-type, surface-active emulsifying agent.

The cellulose nitrate solvent may be a single solvent which is moderately soluble in water, a mixture of solvents, the components of which are moderately soluble in water, or a mixture of solvents, at least one component of which is moderately soluble in water and another component of which is infinitely soluble in water. By "moderately" soluble is meant a solvent which is soluble in water at least to the extent of 5 parts per 100 parts of water at 20° C. but is not infinitely soluble. By "infinitely" soluble is meant a solvent which is soluble in water in all proportions. Maximum solubility in water of the cellulose nitrate solvent should be about 80 parts per 100 parts of water and preferably about 40 to 50 parts. Thus, if a mixed solvent is employed containing an infinitely soluble component, the amount of infinitely soluble component must be adjusted to maintain total solubility in water of the mixed solvent within the desired range.

Examples of moderately water-soluble organic solvents include methyl acetate, ethyl acetate, methyl formate, ethyl formate, methyl ethyl ketone, diethyl ether and nitromethane. The moderately water-soluble solvents preferably range in water-solubility from about 5 to 30 parts per 100 parts of water at 20° C.

Infinitely water-soluble co-solvents include the lower aliphatic alcohols such as methyl, ethyl and propyl alcohols, acetone, methyl lactate, ethyl lactate, and dioxan-1,4.

Where co-solvent mixtures are used, it is not essential that each of the solvent components be a good solvent for the cellulose nitrate so long as they possess good solvent properties when in admixture. Diethyl ether and the lower aliphatic alcohols, for example, though poor solvents for cellulose nitrate per se, possess excellent co-solvent properties. It is desirable that the infinitely soluble component of a mixed cellulose nitrate solvent possess the ability to reduce viscosity of the lacquer. Methanol, ethanol and acetone are particularly effective in this regard.

We have found that particles having the desired characteristics cannot be obtained with a cellulose nitrate solvent which is substantially insoluble in water, namely soluble in water to the extent of less than about 5 parts per 100, or which is excessively soluble. The water solubility must be sufficient so that when the lacquer particles are dispersed in water, the solvent at and adjacent to the surface dissolves with sufficient rapidity in the water to permit some hardening or setting of the particle surface and thus eliminates or markedly reduces the surface tackiness to the point where such surface tackiness will not cause agglomeration. On the other hand, elution of the solvent should not be so rapid that the surface sets into a hard, non-plastic condition before surface tension forces can effectively shape the particles into the desired spherical form. Premature excessive hardening of the particle surface also causes porosity since the non-plastic surface does not permit adequate shrinkage to compensate for removal of solvent from the interior of the particle. With a cellulose nitrate solvent of excessive water-solubility, porosity may also be caused by migration of water into the particle because of the mutual solubility of water and a highly water-soluble solvent. As aforementioned, the water-solubility of the cellulose nitrate solvent, whether single or mixed, should be within a range of about 5 to 80 parts per 100 parts of water at 20° C. and preferably about 5 to 40 or 50.

We have found that to obtain spheres of the desired small size, concentration of the high nitrogen content cellulose nitrate in the lacquer should not exceed about 10% by weight. Optimum concentration is about 5 to 7.5%. Lacquers containing more than about 10% of the high nitrogen cellulose nitrate are highly viscous and are comminuted with difficulty to produce particles of generally excessive size. There is no critical lower limit of cellulose nitrate concentration in the lacquer other than that dictated by economic expediency. Good results are obtainable, for example, with concentrations as low as 2%. This, however, requires the use of large amounts of solvent and large operating equipment relative to the amount of cellulose nitrate processed.

Choice of the particular solvent influences to some degree the cellulose nitrate concentration in the lacquer. Viscosity of the lacquer varies with different solvents and the concentration of cellulose nitrate may be varied accordingly.

Solvent systems which we have found to be particularly satisfactory include methyl acetate, methyl acetate/methanol, ethyl acetate, ethyl acetate/ethanol, ethyl acetate/acetone, ethyl acetate/diethyl ether, methyl ethyl ketone/acetone, methyl ethyl ketone/methanol, and nitromethane.

Where a mixed cellulose nitrate solvent as, for example, one containing an infinitely soluble component, is employed, the ratio of components for optimum performance can readily be determined by routine experimentation. In most cases a ratio of moderately soluble component to infinitely soluble component of 80:20 to 85:15 by volume is particularly good. However, this may be varied so long as total solubility of the mixed solvent does not become excessive.

Choice of solvent is also influenced to some extent by the particular colloiding agent employed. The protective colloid must not be excessively soluble in the cellulose nitrate solvent since, otherwise, the system would tend to form a water-in-oil type emulsion. This situation can be handled by employing a colloid which is not highly soluble in the specific solvent or by avoiding the use of solvents which tend to dissolve the particular colloid out of the water phase.

The cellulose nitrate lacquer is mixed with water in the presence of a suitable colloiding agent and a water-soluble salt or polyhydroxy compound with vigorous agitation to form a dispersion of small spherical lacquer particles with the water as the continuous phase. The colloid and salt are preferably introduced into the water prior to mixing. The dispersion and agitation may be accomplished by any suitable means as, for example, in a homogenizer or other suitable agitating device. The degree of agitation is one of the factors influencing particle size. In general, the more vigorous the agitation, the smaller are the particles.

The amount of water employed in dispersing the cellulose nitrate lacquer is an important factor in determining particle size. Particle size is a function of the lacquer/water ratio in as much as increasing the amount of water increases particle size. Thus the quantity of water used in emulsification is determined in some measure by the particle size desired. The minimum amount of water is governed by the lacquer/water ratio required to permit formation of the requisite oil-in-water type emulsion. If excessive water is employed, the particles become oversize and may also become irregular and porous, apparently because the organic solvent dissolves in the water phase with excessive rapidity so that the surface of the particles hardens into a non-plastic condition before adequate comminution or contraction into spheres. In general, the maximum amount of water which gives satisfactory results in terms of desired particle characteristics is about 100% by volume based on the volume of organic solvent and preferably about 50 to 75%.

We have found that particle characteristics such as size and density are greatly influenced by the particular colloid employed. Non-porous particles within the desired size range can be obtained with the following colloiding agents: methyl cellulose, casein, the condensation product of polyvinyl methyl ether and maleic anhydride, gelatin, agar-agar, polysodium acrylate, polyvinyl alcohol, and alginates.

The colloiding agent must be preferentially soluble in water rather than in the organic solvent to avoid formation of a water-in-oil system. Although the aforementioned colloids are normally hydrophilic, certain ones may be excessively soluble in a particular organic solvent. Methyl cellulose, for example, cannot be employed with ethyl acetate because of its high solubility in this solvent, although it functions well with other solvents such as methyl ethyl ketone/acetone. It is essential, therefore, to employ organic solvent-colloid systems of low mutual solubility relative to the solubility of the colloid in the water. The nitromethane-polyvinyl methyl ether-maleic anhydride system, for example, is excellent because of the insolubility of the colloid in this solvent.

The colloiding agent forms a colloidal solution with the water, thus increasing the viscosity of the water phase, and also surrounds the lacquer particles with a protective coating. These factors stabilize the emulsion by reducing tendency of the particles to coalesce, particularly during stripping of the solvent. This is important since the particles must be maintained in a state of dispersion until surface tackiness has been substantially eliminated and hardening has progressed to the point where the particles will no longer agglomerate.

The amount of colloiding agent employed is determined by several factors. Primarily, it should be sufficient to produce substantial increase in the viscosity of the water phase and to coat the particles, thus providing adequate stabilization of the emulsion during processing. Generally speaking, the higher the molecular weight of the colloid, the less will be required. The colloid is also a factor in controlling particle size since increasing concentration tends to reduce particle size. There is no critical upper limit to the amount of colloid employed other than practical considerations such as desired particle size and ease of washing. The more colloid present, the more washing is required for its removal.

Colloid-organic solvent systems which we have found particularly suitable for our purpose include casein plus ethyl acetate, methyl cellulose plus methyl acetate, methyl ethyl ketone/acetone or methyl ethyl ketone/methanol, polyvinyl methyl ether-maleic anhydride plus nitromethane or ethyl acetate, alginates plus ethyl acetate, and gelatin plus ethyl acetate. The methyl cellulose is preferably of the higher molecular weight variety, namely one having a minimum centipoise value of about 400 and preferably about 1500 to 4000 or higher.

It is essential that a suitable water-soluble salt or an organic polyhydroxy compound be included in the water phase of the emulsion system. It is apparently necessary for the proper functioning of the protective colloid. Without the addition of such compounds, the particles formed are non-spherical and oversize. The salt or polyhydroxy compound prevents the inversion of phase which frequently occurs when the emulsion is heated to distillation temperature to remove the organic solvent. It may be, also, that these additives exert a stabilizing effect by causing hydration of the colloid and thus preventing undue penetration of the colloid into the lacquer particle, and, in the case of the salts, by inducing a charge on the surface of the colloid-enveloped particle which tends to prevent agglomeration.

Any suitable, water-soluble salt which is compatible with the colloiding agent, namely one which will not cause it to precipitate, may be employed as, for example, the metal or ammonium halides, sulfates, acetates and the like. Choice of the particular salt employed is, in some measure, determined by the particular colloid used in the emulsion system. All of the colloiding agents except methyl cellulose function well with salts of any valence, preferably monovalent or divalent salts, as, for example, sodium chloride or sodium sulfate. Methyl cellulose, however, tolerates only monovalent salts such as the alkali metal and ammonium halides. By monovalent salt is meant one in which both the cation and anion are monovalent. By divalent salt is meant one in which at least one ion is divalent. In general, inorganic salts having monovalent cations are preferred, the alkali metal salts being most desirable.

The salt must be employed in an amount less than that which will cause precipitation of the colloid or a "salting out" effect. In general, the lower the molecular weight of the colloid, the greater the amount of salt which it will tolerate. Degree of salt toleration also varies with the particular salt.

We have found that below certain minimum salt concentrations the salt is not effective since the resulting particles tend to be oversize and non-spherical. This minimum amount varies with the particular salt. In general, the minimum concentration for the monovalent salts is about 6.5% based on the weight of the cellulose nitrate and for divalent salts, such as sodium sulfate, about 13%.

Additives other than salts which we have found to perform satisfactorily are water-soluble polyhydroxy compounds such as sugars, glycerin and glycols such as ethylene glycol. In general, a minimum of about 6.5% on the cellulose nitrate is desirable for satisfactory performance.

In some cases, it may be desirable, though not essential, to include in the system a polar-type, surface-active emulsifying agent which produces a marked lowering of interfacial tension and which, unlike the higher molecular weight colloiding agent, does not produce any appreciable increase in the viscosity of the water phase. The surface-active emulsifying agent is advantageous in as much as in some instances it makes possible a reduction in the amount of colloid required for optimum performance and thus facilitates subsequent removal of the colloid from the particles. It also reduces the amount of energy and time required to disperse the lacquer in the water and to comminute it to the desired particle size.

Any suitable surface-active emulsifying agent may be employed which is compatible with the other components of the system and which is substantially soluble in water, namely possesses a sufficiently high hydrophile-lipophile balance to prevent its being drawn into the organic solvent and converting the emulsion into a water-in-oil system, may be employed, such as alkyl sulfates or sulfonates, alkylaryl sulfonates, alkali metal soaps, alkali metal and ammonium salts of perfluoro acids, alkali metal salts of sulfosuccinic acids, sulfonated oils including sulfonated vegetable oils and sulfonated hydrocarbon oils, polyglycols and the like. The moderately active types of emulsifying agents such as the sulfonated vegetable oils as, for example, sulfonated castor oil, sulfonated coconut oil and the like, sulfonated hydrocarbon oils as, for example, sulfonated petroleum fractions, alkali metal fatty acid soaps, polyglycols such as polyethylene glycol and polypropylene glycol, and the like, are especially satisfactory. The polyglycols, in addition to their dispersing action, also may be advantageous as coupling agents, namely as agents which increase solubility of the colloid or the organic solvent in water.

The amount of surface-active emulsifier is not critical but should be sufficient to promote the desired rapid emulsification and comminution of the particles. As little as about 0.01 to 0.25% based on the water phase may be adequate. The amount may be increased to as much as 5 to 10% in some cases. Concentrations of emulsifier in the range of about 0.01 to 2% are generally satisfactory. The emulsifier may be added to the water or to the lacquer phase.

After emulsification is completed, the organic solvent is removed from the dispersed particles by distillation or by elution. In either case, the emulsion should be maintained in a state of continuous vigorous agitation.

Distillation is accomplished by heating the emulsion to or near the boiling point of the organic solvent. If the distillation is conducted at atmospheric pressure, it is desirable that the solvent or the least volatile component of a mixed solvent has a boiling point below 100° C. to maintain stability both of the cellulose nitrate and of the emulsion. In many cases, it may be desirable to distill under reduced pressures, particularly if the boiling point is above 100° C.

Another effective method for removing the organic solvent is by diluting the emulsion with water in amount sufficient substantially completely to dissolve the solvent out of the cellulose nitrate particles. Since it is desirable to maintain the effective salt or polyhydroxy compound concentration throughout the disperse phase of the particles, it is preferable to include these solutes in the elution water prior to dilution of the emulsion. The total amount of water should be in excess of the theoretical amount required for solution of the organic solvent, preferably in substantial excess.

After removal of the organic solvent, the cellulose nitrate particles are separated from the water, washed with water and dried. Removal of the colloid may require several washings. In general, the smaller the particles, the more water washings are required.

The cellulose nitrate particles prepared according to our process are spherical and may be obtained in sizes as small as 1 micron or less in diameter. The particle size generally ranges up to about 10 or 30 microns. This is the preferred size range. Depending upon the specific components and concentrations employed in the process, particle size may range up to about 100 microns. In general, products in which the average particle diameter is above about 50 microns are marginal. In other words, it is preferable that the size distribution of the particles by number be such that the maximum average size is about 50 microns. Since all of the particles in a given production batch are obtainable in the desired small-size range, there is no necessity for fractional screening or reworking of excessively large particles.

Density of the cellulose nitrate spheres is high. Average density of the spheres is about 1.49 to 1.54 with a minimum of about 1.4 as compared with published cellulose nitrate densities of 1.58 to 1.66.

The small, dense, spherical particles of cellulose nitrate are highly suitable for use in the manufacture of smokeless powder charges and propellants in any desired and conventional manner. They are especially useful, however, in that they can be suspended in a non-volatile plasticizer to form homogeneous, stable fluid slurries which may be poured as coatings or films without requiring the addition of water or a volatile solvent and may be molded into objects of any desired shape and size without the application of high temperatures and pressures.

Nitroglycerin is readily incorporated with the cellulose nitrate particles by introducing it into the lacquer. It may be added with the organic solvent prior to solution of the cellulose nitrate or it can be added to the cellulose nitrate-solvent solution. Stabilizing agents such as diphenyl amine, lecithin, ethyl centralite and the like can similarly be added.

EXAMPLE I 20 grams of cellulose nitrate (12.6% N) were dissolved in 200 ml. ethyl acetate to form a clear lacquer. 8 grams casein, 8 grams $Na_2SO_4$ and 0.3 gram ethyl centralite were dissolved in 150 ml. water. The aqueous solution was added to the cellulose nitrate lacquer in a homogenizer. The emulsion was agitated vigorously for about 5 minutes and then was heated to about 77° C. to distill off the ethyl acetate from the dispersed spherical particles. Vigorous agitation was maintained during distillation. The product was washed with water 3 times, filtered, washed again with water and dried. The product was in the form of spherical particles ranging in size from 2 to 20 microns with an average size of 12 microns and having a density of 1.54.

EXAMPLE II 10 grams of cellulose nitrate (12.6% N) were dissolved in 200 ml. ethyl acetate to form a clear lacquer. 8 grams gelatin (Knox) and 14 grams $Na_2SO_4$ were dissolved in 150 ml. water. The aqueous solution was added to the cellulose nitrate lacquer in a homogenizer. The emulsion was agitated vigorously for about 5 minutes. The organic solvent was dissolved out of the spherical particles by flooding the emulsion with about 4 volumes of water containing about 2% of the salt under continued agitation. The product was filtered, washed with water about 3 times and then dried. The spherical particles ranged in size from 1 to 10 microns and had a density of about 1.49.

Other examples illustrating our invention are summarized in Table I. The particles in all cases were spherical.

and up to about 100% by volume based on the organic solvent, the colloiding agent being present in amount sufficient to increase substantially the viscosity of the water phase, removing the organic solvent from the dispersed particles by diluting the emulsion with sufficient Table I

| Cellulose nitrate | | Solvent, ml. | Colloid, grams | Other additives | Solute, grams | Water, ml. | Size, μ |
|---|---|---|---|---|---|---|---|
| Percent N | g. | | | | | | |
| 12.6 | 20 | Ethyl acetate, 200 | Casein, 12 | Ethyl centralite, 0.3 g. | $Na_2SO_4$, 8 | 150 | 2-40, av. 20. |
| 12.6 | 20 | ....do.... | Casein, 8 | Ethyl centralite, 0.3 g.; Glyceryl monoricinoleate, 1 g. | $Na_2SO_4$, 8 | 150 | 2-35, av. 15. |
| 12.6 | 20 | ....do.... | ....do.... | Ethyl centralite, 0.3 g.; Polyethylene glycol, 6 g. | $Na_2SO_4$, 8 | 150 | 2-40, av. 20. |
| 12.6 | 20 | ....do.... | ....do.... | Ethyl centralite, 0.3 g. | Sugar, 8 | 150 | 10-40, av. 20. |
| 12.6 | 20 | ....do.... | ....do.... | ....do.... | Ethylene glycol, 8. | 150 | 2-30, av. 15. |
| 12.6 | 20 | ....do.... | ....do.... | ....do.... | Glycerin, 8 | 150 | 2-15. |
| 12.6 | 20 | ....do.... | Casein, 8; Polyvinyl methyl ether-maleic anhydride, 1. | ....do.... | $Na_2SO_4$, 8 | 150 | 2-30, av. 15. |
| 12.6 | 20 | Ethyl acetate, 180; Ethanol, 20. | Casein, 8 | ....do.... | $Na_2SO_4$, 8 | 150 | 2-30, av. 15. |
| 12.6 | 20 | Ethyl acetate, 170; Acetone, 30. | ....do.... | ....do.... | $Na_2SO_4$, 8 | 150 | 10-35, av. 18 and 2-5. |
| 12.6 | 20 | Ethyl acetate, 170; Ethyl ether, 30. | ....do.... | ....do.... | $Na_2SO_4$, 8 | 150 | 2-20, av. 15. |
| 12.6 | 20 | Ethyl acetate, 200 | ....do.... | ....do.... | $Na_2SO_4$, 4 | 150 | 10-40, av. 20. |
| 12.6 | 20 | Ethyl acetate, 170; Ethyl ether, 30. | ....do.... | ....do.... | Hexalene glycol, 8. | 150 | 2-30, av. 15. |
| 12.6 | 10 | Ethyl acetate, 200 | ....do.... | ....do.... | $Na_2SO_4$, 8 | 150 | 2-15, av. 8. |
| 12.6 | 15 | ....do.... | ....do.... | Ethyl centralite, 0.3 g.; Polyethleneglycol, 0.5 g. | $Na_2SO_4$, 8 | 150 | 2-25, av. 10. |
| 12.6 | 20 | Methyl ethyl ketone, 170; Methanol, 30. | Methyl cellulose, 4,000 cps., 2.1. | Ethyl centralite, 0.3 g.; Turkey red oil, 1.6 g. | NaCl, 4 | 150 | 2-40. |
| 13.43 | 20 | Methyl ethyl ketone, 170; Acetone, 30. | ....do.... | ....do.... | NaCl, 4 | 150 | 1-10. |
| 12.6 | 20 | ....do.... | ....do.... | ....do.... | NaCl, 4 | 150 | 1-20. |
| 13.35 | 10 | Methyl acetate, 200 | Methyl cellulose, 1,500 cps., 0.5. | Ethyl centralite, 0.3 g. | $Na_2SO_4$, 4 | 150 | 1. |
| 12.6 | 10 | Ethyl acetate, 200 | Agar-agar, 4 | ....do.... | $Na_2SO_4$, 4 | 150 | 10-40. |
| 12.6 | 10 | ....do.... | Agar-agar, 8 | ....do.... | $Na_2SO_4$, 4 | 150 | 5-15. |
| 12.6 | 10 | ....do.... | Agar-agar, 12 | ....do.... | $Na_2SO_4$, 4 | 150 | 15-30. |
| 13.35 | 14 | ....do.... | Polyvinyl alcohol, 2 | ....do.... | $Na_2SO_4$, 4 | 200 | 1-2. |
| 13.35 | 14 | ....do.... | Polyvinyl alcohol, 4 | ....do.... | $Na_2SO_4$, 4 | 200 | 1. |
| 12.6 | 10 | ....do.... | Gelatin, 8 | ....do.... | $Na_2SO_4$, 4 | 150 | 5-10. |
| 12.6 | 10 | ....do.... | Gelatin, 6 | ....do.... | $Na_2SO_4$, 4 | 150 | 5-30, av. 10-15. |
| 12.6 | 14 | ....do.... | Gelatin, 12 | ....do.... | $Na_2SO_4$, 4 | 150 | 1-40. |
| 12.6 | 10 | ....do.... | Gelatin, 4 | ....do.... | $Na_2SO_4$, 4 | 150 | 5-30. |
| 12.6 | 10 | ....do.... | Gelatin, 8 | ....do.... | $Na_2SO_4$, 12 | 150 | 5-15. |
| 12.6 | 10 | ....do.... | Gelatin, 8 | ....do.... | $Na_2SO_4$, 8 | 150 | 5-15. |
| 12.6 | 10 | ....do.... | Gelatin, 8 | ....do.... | $Na_2SO_4$, 10 | 150 | 1-15. |
| 12.6 | 20 | Nitromethane, 200 | Gelatin, 32 | ....do.... | $Na_2SO_4$, 12 | 150 | 5-30. |
| 13.4 | 10 | Ethyl acetate, 200 | Gelatin, 8; Alginate[1], 0.5 | Diphenyl amine, 0.2 g. | $Na_2SO_4$, 10 | 150 | 2-10. |
| 12.6 | 10 | ....do.... | Alginate, 6 | ....do.... | $Na_2SO_4$, 4 | 150 | 7-15. |
| 12.6 | 10 | ....do.... | Alginate, 10 | Ethyl centralite, 0.2 g. | $Na_2SO_4$, 4 | 150 | 5-20. |
| 12.6 | 10 | ....do.... | Alginate, 12 | ....do.... | $Na_2SO_4$, 4 | 150 | 5-15. |
| 13.35 | 10 | ....do.... | Polysodium acrylate, 3 | ....do.... | $Na_2SO_4$, 4 | 150 | 20-40. |
| 12.6 | 10 | ....do.... | Polyvinyl methyl ether-maleic anhydride, 4. | ....do.... | $Na_2SO_4$, 4 | 150 | 1-10. |
| 12.6 | 20 | Nitromethane, 200 | Polyvinyl methyl ether-maleic anhydride, 6. | ....do.... | $Na_2SO_4$, 12 | 150 | 2-20. |

[1] Kelcoloid LV.

Although this invention has been described with reference to illustrative embodiments thereof, it will be apparent to those skilled in the art that it may be embodied in other forms but within the scope of the appended claims.

We claim:
1. A process for making small, substantially nonporous, substantially spherical particles of cellulose nitrate having a nitrogen content of more than 12%, the particles being characterized by maximum diameter of about 100 microns which comprises dissolving up to about 10% of said cellulose nitrate in an organic solvent which is moderately soluble in water to the extent of at least about 5 parts per 100 parts of water at 20° C., any component of said solvent having a minimum water solubility of at least about 5 parts, dispersing the cellulose nitrate solution in water in the presence of a colloiding agent selected from the group consisting of methyl cellulose, casein, polyvinyl methyl ether-maleic anhydride, gelatin, agar-agar, polysodium acrylate, polyvinyl alcohol, and alginates; and a solute selected from the group consisting of water-soluble salts and water-soluble polyhydroxy compounds; the water being present in amount sufficient to form an oil-in-water type emulsion water to dissolve the organic solvent out of the dispersed cellulose nitrate particles, said water containing dissolved solute selected from the group consisting of water-soluble salts and water-soluble polyhydroxy compounds, and separating the particles from water.

2. The process of claim 1 in which, in addition to the colloiding agent and water-soluble solute, dispersion of the cellulose nitrate solution is carried out in the presence of a polar-type, surface-active emulsifying agent.

3. The process of claim 1 in which the solute present in the water employed for dispersing the cellulose nitrate solution is a water-soluble inorganic salt in an amount comprising at least about 6.5% by weight based on the cellulose nitrate and less than that which causes precipitation of the colloiding agent, and the solute present in the water employed for dissolving the organic solvent out of the dispersed cellulose nitrate particles is a water-soluble inorganic salt.

4. The process of claim 2 in which the solute present in the water employed for dispersing the cellulose nitrate solution is a water-soluble inorganic salt in an amount comprising at least about 6.5% by weight based on the cellulose nitrate and less than that which causes precipitation of the colloiding agent, and the solute present in the water employed for dissolving the organic solvent out of the dispersed cellulose nitrate particles is a water-soluble inorganic salt.

5. The process of claim 1 in which the organic solvent has a maximum water-solubility of about 50 parts per 100 parts of water at 20° C. and comprises at least two components, one of said components being moderately soluble in water to the extent of at least about 5 parts per 100 parts of water at 20° C. and another of said components being infinitely soluble in water.

6. The process of claim 2 in which the organic solvent has a maximum water-solubility of about 50 parts per 100 parts of water at 20° C. and comprises at least two components, one of said components being moderately soluble in water to the extent of at least about 5 parts per 100 parts of water at 20° C. and another of said components being infinitely soluble in water.

7. The process of claim 3 in which the salt is one, the cation of which is selected from the group consisting of alkali metal and ammonium and the anion of which is selected from the group consisting of halide and sulfate.

8. The process of claim 4 in which the salt is one, the cation of which is selected from the group consisting of alkali metal and ammonium and the anion of which is selected from the group consisting of halide and sulfate.

9. A process for making small, substantially non-porous, substantially spherical particles of cellulose nitrate having a nitrogen content of more than 12%, the particles being characterized by maximum diameter of about 100 microns which comprises dissolving up to about 10% of said cellulose nitrate in an organic solvent which is moderately soluble in water to the extent of at least about 5 parts per 100 parts of water at 20° C., any component of said solvent having a minimum water solubility of at least about 5 parts, dispersing the cellulose nitrate solution in water in the presence of methyl cellulose and a monovalent water-soluble salt, the water being present in amount sufficient to form an oil-in-water type emulsion and up to about 100% by volume based on the organic solvent, the methyl cellulose being present in amount sufficient to increase substantially the viscosity of the water phase, the salt being in an amount comprising at least about 6.5% by weight based on the cellulose nitrate and less than that which causes precipitation of the colloiding agent, removing the organic solvent from the dispersed particles by diluting the emulsion with sufficient water to dissolve the organic solvent out of the dispersed cellulose nitrate particles, said water containing dissolved monovalent, water-soluble salt, and separating the particles from the water.

10. The process of claim 9 in which the organic solvent is a mixture of methyl ethyl ketone and acetone and the salt is sodium chloride.

11. A process for making small, substantially non-porous, substantially spherical particles of cellulose nitrate having a nitrogen content of more than 12%, the particles being characterized by maximum diameter of about 100 microns which comprises dissolving up to about 10% of said cellulose nitrate in an organic solvent which is moderately soluble in water to the extent of at least about 5 parts per 100 parts of water at 20° C., any component of said solvent having a minimum water solubility of at least about 5 parts, dispersing the cellulose nitrate solution in water in the presence of casein and a water-soluble inorganic salt, the water being present in amount sufficient to form an oil-in-water type emulsion and up to about 100% by volume based on the organic solvent, the casein being present in amount sufficient to increase substantially the viscosity of the water phase, the salt being in an amount comprising at least about 6.5% by weight based on the cellulose nitrate and less than that which causes precipitation of the colloiding agent, removing the organic solvent from the dispersed particles by diluting the emulsion with sufficient water to dissolve the organic solvent out of the dispersed cellulose nitrate particles, said water containing dissolved, water-soluble inorganic salt, and separating the particles from the water.

12. The process of claim 11 in which the organic solvent is ethyl acetate and the salt is one, the cation of which is selected from the group consisting of alkali metal and ammonium and the anion of which is selected from the group consisting of halide and sulfate.

13. A process for making small, substantially non-porous, substantially spherical particles of cellulose nitrate having a nitrogen content of more than 12%, the particles being characterized by maximum diameter of about 100 microns, which comprises dissolving up to about 10% of said cellulose nitrate in an organic solvent which is moderately soluble in water to the extent of at least about 5 parts per 100 parts of water at 20° C., any component of said solvent having a minimum water solubility of at least about 5 parts, dispersing the cellulose nitrate solution in water in the presence of polyvinyl methyl ether-maleic anhydride and a water-soluble inorganic salt, the water being present in amount sufficient to form an oil-in-water type emulsion and up to about 100% by volume based on the organic solvent, the polyvinyl methyl ether-maleic anhydride being present in amount sufficient to increase substantially the viscosity of the water phase, the salt being in an amount comprising at least about 6.5% by weight based on the cellulose nitrate and less than that which causes precipitation of the colloiding agent, removing the organic solvent from the dispersed particles by diluting the emulsion with sufficient water to dissolve the organic solvent out of the dispersed cellulose nitrate particles, said water containing dissolved, water-soluble inorganic salt, and separating the particles from the water.

14. The process of claim 13 in which the organic solvent is nitromethane and the inorganic salt is one, the cation of which is selected from the group consisting of alkali metal and ammonium and the anion of which is selected from the group consisting of halide and sulfate.

15. The process of claim 13 in which the organic solvent is ethyl acetate and the inorganic salt is one, the cation of which is selected from the group consisting of alkali metal and ammonium and the anion of which is selected from the group consisting of halide and sulfate.

16. A process for making small, substantially non-porous, substantially spherical particles of cellulose nitrate having a nitrogen content of more than 12%, the particles being characterized by maximum diameter of about 100 microns, which comprises dissolving up to about 10% of said cellulose nitrate in an organic solvent which is moderately soluble in water to the extent of at least about 5 parts per 100 parts of water at 20° C., any component of said solvent having a minimum water solubility of at least about 5 parts, dispersing the cellulose nitrate solution in water in the presence of gelatin and a water-soluble inorganic salt, the water being present in amount sufficient to form an oil-in-water type emulsion and up to about 100% by volume based on the organic solvent, the gelatin being present in amount sufficient to increase substantially the viscosity of the water phase, the salt being in an amount comprising at least about 6.5% by weight based on the cellulose nitrate and less than that which causes precipitation of the colloiding agent, removing the organic solvent from the dispersed particles by diluting the emulsion with sufficient water to dissolve the organic solvent out of the dispersed cellulose nitrate particles, said water containing dissolved, water-soluble inorganic salt, and separating the particles from the water.

17. The process of claim 16 in which the organic solvent is ethyl acetate and the inorganic salt is one, the cation of which is selected from the group consisting of alkali metal and ammonium and the anion of which is selected from the group consisting of halide and sulfate.

References Cited in the file of this patent

UNITED STATES PATENTS

| | | |
|---|---|---|
| 2,027,114 | Olsen et al. | Jan. 7, 1936 |
| 2,160,626 | Schaefer | May 30, 1939 |
| 2,375,175 | Silk | May 1, 1945 |

OTHER REFERENCES

Olive: Ball Powder Process, Chemical Engineering, vol. 53, pp. 92–96 (No. 12, December 1946).